(12) United States Patent
Rickard et al.

(10) Patent No.: US 7,020,074 B1
(45) Date of Patent: Mar. 28, 2006

(54) SYNCHRONIZATION METHOD AND APPARATUS FOR FREQUENCY DIVISION MULTIPLEXED TELECOMMUNICATION SYSTEMS

(75) Inventors: Robin Paul Rickard, Harlow (GB); John Christopher Greenwood, Nr Chippenham Wiltshire (GB); Philip Athelstan Wainman, Ongar (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/542,007

(22) Filed: Apr. 3, 2000

(51) Int. Cl.
*H04J 11/00* (2006.01)

(52) U.S. Cl. .................................. 370/210; 370/503
(58) Field of Classification Search ................ 370/208, 370/210, 503, 507, 516, 518, 519, 480, 484; 375/316, 354, 356, 357, 359, 362, 371, 373, 375/375
See application file for complete search history.

(56) References Cited

U.S. PATENT DOCUMENTS

| | | | | |
|---|---|---|---|---|
| 5,602,835 A | * | 2/1997 | Seki et al. | 370/206 |
| 5,726,973 A | * | 3/1998 | Isaksson | 370/203 |
| 5,959,965 A | * | 9/1999 | Ohkubo et al. | 370/203 |
| 6,088,327 A | * | 7/2000 | Muschallik et al. | 370/210 |
| 6,237,013 B1 | * | 5/2001 | Usui | 708/422 |
| 6,252,908 B1 | * | 6/2001 | Tore | 375/259 |
| 6,314,083 B1 | * | 11/2001 | Kishimoto et al. | 370/210 |
| 6,359,938 B1 | * | 3/2002 | Keevill et al. | 375/316 |
| 6,363,084 B1 | * | 3/2002 | Dejonghe | 370/480 |
| 6,628,738 B1 | * | 9/2003 | Peeters et al. | 375/371 |
| 2002/0075797 A1 | * | 6/2002 | Kilani | 370/208 |
| 2003/0072255 A1 | * | 4/2003 | Ma et al. | 370/208 |
| 2003/0112743 A1 | * | 6/2003 | You et al. | 370/203 |

* cited by examiner

*Primary Examiner*—Wellington Chin
*Assistant Examiner*—Mark A Mais
(74) *Attorney, Agent, or Firm*—Barnes & Thornburg LLP

(57) ABSTRACT

In a frequency division multiplexed (FDM) telecommunications system, data is encoded on carriers stepped in frequency within each of a sequence of symbols. The carriers may be arranged in groups between which there are frequency bands in which interference may be expected. The symbols are of predetermined length and are transmitted at a predetermined frequency, and synchronisation to the symbols is needed at a receiver in order to decode the received symbols. During a synchronisation time, a sequence of synchronisation symbols carrying predetermined data is transmitted. The receiver performs unsynchronised Fast Fourier Transforms (FFTs) on the received symbols, starting successive FFTs at about the predetermined symbol frequency. The output of each FFT is evaluated by removing the predetermined data coding from the detected carriers and summing the detected phase differences between the carriers. If the sum exceeds a predetermined threshold, synchronisation between the FFT and a symbol is declared and used to synchronise subsequent FFTs to subsequent symbols.

21 Claims, 4 Drawing Sheets

SYNCHRONIZATION METHOD AND APPARATUS FOR FREQUENCY DIVISION MULTIPLEXED TELECOMMUNICATION SYSTEMS

TECHNICAL FIELD

This invention relates to a synchronisation method and apparatus for frequency division multiplexed (FDM) telecommunications systems, and in particular for orthogonal FDM (OFDM) telecommunications systems.

BACKGROUND OF THE INVENTION

A frequency domain telecommunications transmission such as an OFDM transmission typically comprises a series of symbols of fixed duration, or length, each containing data modulated onto a number of carriers, or tones, of different frequencies. A typical symbol may be of length 250 microseconds, in which case the carriers are spaced at frequency intervals of 4 kHz to ensure orthogonality between the carriers. Depending on the frequency bandwidth available, the symbol may contain, for example, 1000 carriers. If each carrier is phase modulated using quadrature phase shift keying (QPSK), each carrier can carry two bits of data. Each symbol then carries 2000 bits.

In the sequence of symbols, adjacent symbols are separated by a few microseconds, such as 10 microseconds. FIG. 1 illustrates a sequence of symbols 20 separated by gaps 22.

It is known to transport telecommunications signals using a frequency domain transmission system in a plurality of separate frequency bands at the same time. The frequency bands may be non-contiguous. Such transmission can be achieved using a frequency domain modulation scheme such as OFDM or coded OFDM (COFDM) and is desirable in transmission media which carry other signals in predetermined frequency bands or suffer from noise in particular frequency bands.

Examples of such media are the use of powerlines (PL) for transporting telecommunications data to and from subscribers, cable television (CATV) systems and fixed wireless access (FWA) systems.

Use of OFDM for signal transmission in PL media is known from U.S. 09/419,209, which is incorporated herein by reference. U.S. 09/419,209 also describes the use of OFDM for signal transmission in more than one frequency band, as follows.

One of the problems with using power lines as a communications medium is that they are subject to noise and interference. A first type of noise is due to cables picking up radio signals such as broadcast AM radio signals and amateur radio band transmissions. Overhead cables are particularly prone to this type of noise. A second type of electrical noise is due to electrical equipment coupled to the power lines. Electric motors, thermostats and gas discharge lighting are particularly prone to generating noise. Noise propagates along the power lines and combines with communications signals. The level of noise can be high enough, and persist for long enough, to corrupt communications signals.

CATV and FWA suffer similar problems, though not necessarily from the same source. For example, in CATV noise can result from ingress at the consumer connection and inter-modulation products from the TV carriers.

FIG. 2 shows typical background noise on an underground power line across the frequency band 0–10 MHz. It is known to be advantageous to transmit communications signals within the frequency bands 2.2–3.5 MHz (PLT1) and 4.2–5.8 Mz (PLT2) because these bands fall between the medium wave and short wave bands used for broadcast radio transmissions and avoid the radio amateur band at 3.5–3.8 MHZ. There is a reduced level of background noise in these bands and the radiation of power line communications signals in this frequency band causes minimum interference with radio receiver equipment at subscriber premises. Other frequency bands in the range of, for example, 2–30 MHz can be used although it is preferred to use the lower frequencies because attenuation over the distribution cables is lower.

The use of OFDM provides flexibility to fit into non-uniform and non-contiguous frequency allocations, while maintaining reasonable spectral efficiency. As illustrated in FIG. 3, this results from the intrinsic nature of an OFDM signal, which is composed of a large number of simultaneously transmitted sub-carriers 24 which are staggered in frequency each individually occupying a low bandwidth (a reduced number of carriers is shown schematically in FIG. 3). Portions 26, 28 of a symbol containing such carriers can be placed in non-contiguous bands between frequency bands 30 in which noise or other signals are present.

The scheme's flexibility comes about from the ability to designate which carriers within an available frequency range are to be activated and which are not. Regarding spectral efficiency, the signal composition results in an intrinsic spectrum fall-out outside the active bandwidth commensurate with the bandwidth of each carrier rather than with the total spectrum width. Thus relatively low excess bandwidths can be achieved.

Therefore, the spectral attributes of OFDM represent a major advantage in favour of its selection for use in power line telecommunication systems.

Symbol Synchronisation

To decode a FDM symbol, a receiver uses a Fast Fourier Transform (FFT) to convert the symbol from the frequency domain to the time domain, in order to recover the transmitted data. To use an FFT to decode a symbol and extract data using an FFT processor at a receiver, it is necessary to know the time of arrival of the symbol at the receiver because the FFT can only be performed once, and the samples input to the FFT processor (after analogue to digital (A/D) conversation of the received symbol) must be taken only during the symbol period. The acquisition of symbol arrival time information to sufficient accuracy to perform an FFT (accuracy of approximately 5 microseconds on a 250 microsecond symbol is required) can be termed coarse synchronisation. As a second function, it is also necessary to adjust the sampling clock in the receiver to match the transmitter clock, in order to allow demodulation of long sequences of symbols containing phase modulated data without re-adjustment of a phase reference at the receiver. This can be termed fine synchronisation.

Conventional Coarse Synchronisation

This is achieved either by a front/back correlation method or by amplitude envelope detection.

In a front/back correlation method, as conventionally used in Digital Video Broadcasting (DVB), transmitted symbols are elongated during a synchronisation period by copying a portion of the frequency domain signal from the front, or start, of each symbol onto the end of the same symbol. Because there is an integral number of cycles of each carrier frequency during the original symbol period, the transition from the end of the original symbol to the elongating portion is phase continuous, and so does not corrupt the frequency spectrum. FIG. 4 illustrates schematically an extended symbol 10 in which the start portion 12 of a standard symbol 14 has been duplicated at the end portion 16 of the extended symbol.

At the receiver, the received signal is split into two portions, and one portion is delayed by the known normal symbol period. Correlation of the received and delayed data streams produces a peak correlation signal when the end portion of an extended symbol in the received data stream coincides with the front portion of the same symbol in the delayed data stream. The correlation peak provides a timing signal allowing the receiver to synchronise to the symbol timing.

The front/back correlation method of synchronisation is disadvantageously vulnerable to out of band carriers or interference in systems such as the media described above, where different signals may be carried in different frequency bands or significant levels of interference in certain frequency bands may be expected. In practice, the correlation process, using for example an 11.25 microsecond window, provides about 20 dB processing gain, depending on the autocorrelation function of the interfering signal. This gain may not be sufficient to synchronise to received symbols in the presence of significant out of band noise. In addition, the receiver uses an FFT as a filter in the data decoding phase, after synchronisation, which rejects out of band carriers. Typically the FFT has a stop band rejection of about 50 dB. The filtering action of the FFT is therefore much higher than that of the correlation process, potentially leading to the undesirable situation that the synchronisation process could be less robust than the data decoding process.

The amplitude envelope detection method of synchronisation involves the direct detection of symbols as received, as pulses of known length in the received signal itself. This system is usually less robust than the front/back correlation method, particularly in dual mode digital/analogue systems. In such cases, analogue transmissions carried in frequency bands outside the frequency band carrying digital symbols may generate signal bursts of variable length, which may include the length of the digital modem symbol. This may lead to false synchronisation timing in the amplitude envelope detection method.

SUMMARY OF THE INVENTION

An object of the invention is to provide a more robust synchronisation technique for frequency domain transmission than in the prior art, which can effectively reject out of band signals or interference.

A further object of the invention is to provide a synchronisation technique which is as robust as the data extraction process used to decode data transmissions.

The invention provides a synchronisation method, apparatus and signal as defined in the appended independent claims. Preferred or advantageous features of the invention are defined in dependent subclaims.

Because the invention carries out synchronisation after an FFT process has been performed on a received signal, it may advantageously allow synchronisation of an FFT at a receiver with received symbols with the same level of stop band rejection as the data decoding process at the receiver. Although this feature may be advantageous in a wide range of telecommunications systems it may be of particular value in telecommunications media such as PL, CATV or FWA where other analogue or digital transmissions may be carried in other frequency bands or where significant interference in other frequency bands is expected.

In a first aspect, the invention may advantageously achieve synchronisation by performing at a receiver a sequence of unsynchronised FFTs on a received synchronisation signal comprising a sequence of FDM synchronisation symbols carrying predetermined data. For each FFT the data coding is removed from the carriers, as detected by the FFT, and the detected carrier phases are summed, preferably coherently, to calculate an output sum. Synchronisation between an FFT and a symbol is declared if the output sum exceeds a predetermined threshold. Subsequent synchronisation between FFTs and symbols may then advantageously be maintained by matching the receiver clock frequency to the transmitted symbol frequency, and preferably checked by periodic implementations of the synchronisation method of the invention.

The step of comparing the output sum with a threshold effectively assesses whether the timing of an FFT coincides with a symbol such that the sampling time of the FFT falls substantially within the length of the symbol. If the FFT sampling time bridges two symbols, for example, the detected carrier phases are likely to be random and so the output sum will usually be close to zero.

In an alternative aspect of the invention, synchronisation between an FFT and a symbol may be declared on the basis of power envelope detection after the FFT has been performed. By this method a scalar addition of the outputs of each FFT (excluding unused frequencies) is performed, and synchronisation is declared if this exceeds a pre-set threshold. This technique may be less reliable than the coherent addition method according to the first aspect of the invention described above, especially in noisy media, but can advantageously be performed in the absence of knowledge of the coding on the received symbol.

In a preferred embodiment, synchronisation symbols of greater length than normal, data-carrying symbols may be used. This increases the chance that the sampling time of an unsynchronised FFT will fall within the length of a synchronisation symbol, and therefore that synchronisation will be declared. However, use of an extended length synchronisation symbol decreases the synchronisation accuracy resulting from such a declaration. Extended length synchronisation symbols may therefore advantageously be combined with the following preferred feature of the invention.

In this preferred feature, after a declaration of synchronisation, the relative phases of the carriers detected by the FFT are considered. All the carriers are in phase at the start of each symbol but have different frequencies. Their relative phases therefore change progressively during each symbol. The relative phases of the carriers as detected are assessed by evaluating a phase gradient across the frequencies of the carriers in the symbol (any gaps in the frequencies covered, if the symbol occupies two or more non-contiguous frequency bands, are automatically accommodated because only the phases and frequencies of individual carriers are assessed), from which the timing error between the start of the symbol and the start of the FFT can be estimated. The synchronisation of subsequent FFTs to subsequent symbols can then take account of this timing error.

This preferred feature may particularly advantageously be combined with the use of extended-length symbols as described above, but may also advantageously be applied to aspects of the invention using normal-length symbols.

BRIEF DESCRIPTION OF THE DRAWINGS

Specific embodiments and the best mode of the invention will now be described by way of example with reference to the drawings, in which.

SPECIFIC DESCRIPTION OF PREFERRED EMBODIMENTS AND BEST MODE

The preferred embodiment of the invention allows initialization of communications between a transmitter and a receiver using a frequency division multiplexed (FDM) transmission protocol, such as orthogonal frequency division multiplexing (OFDM). The transmitter encodes successive data packets for transmission as successive OFDM symbols, each comprising a plurality of carriers of different, stepped frequencies. Each carrier is phase modulated using, for example, quadrature phase shift keying (QPSK) to encode two bits of data as described above.

Figure 1:
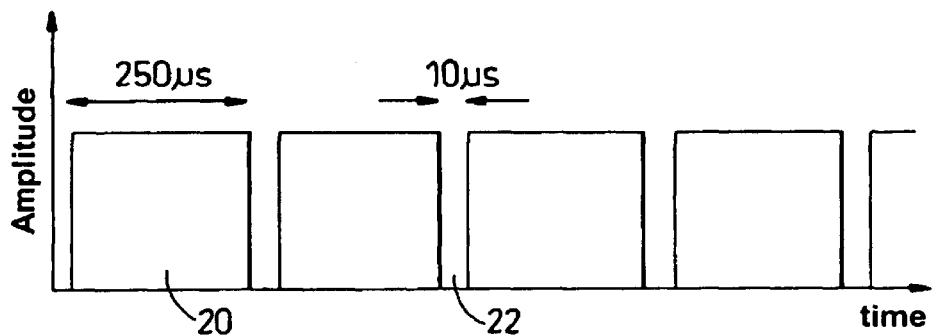
FIG. 1 is a plot of amplitude vs. time showing a sequence of transmitted normal-length symbols.
Figure 3:
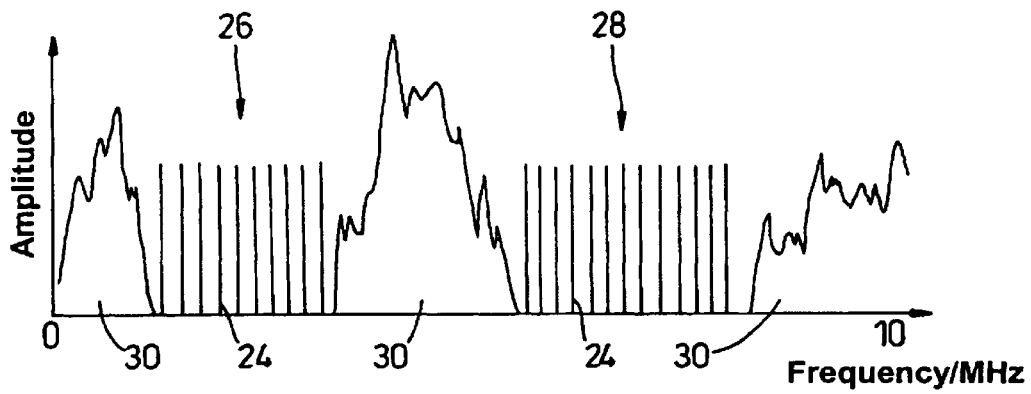
FIG. 3 is a plot of amplitude vs. frequency illustrating non-contiguous frequency band use.
Figure 4:
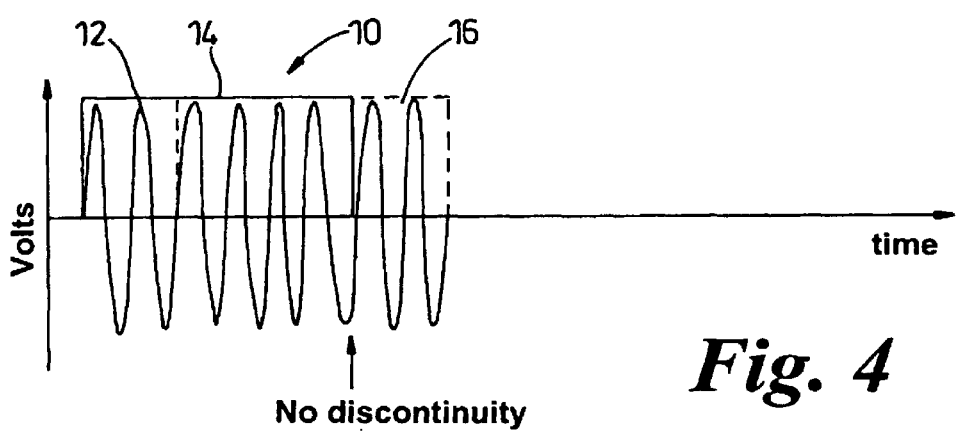
FIG. 4 is plot of voltage vs. time illustrating the prior art front/back synchronisation method.
Figure 2:
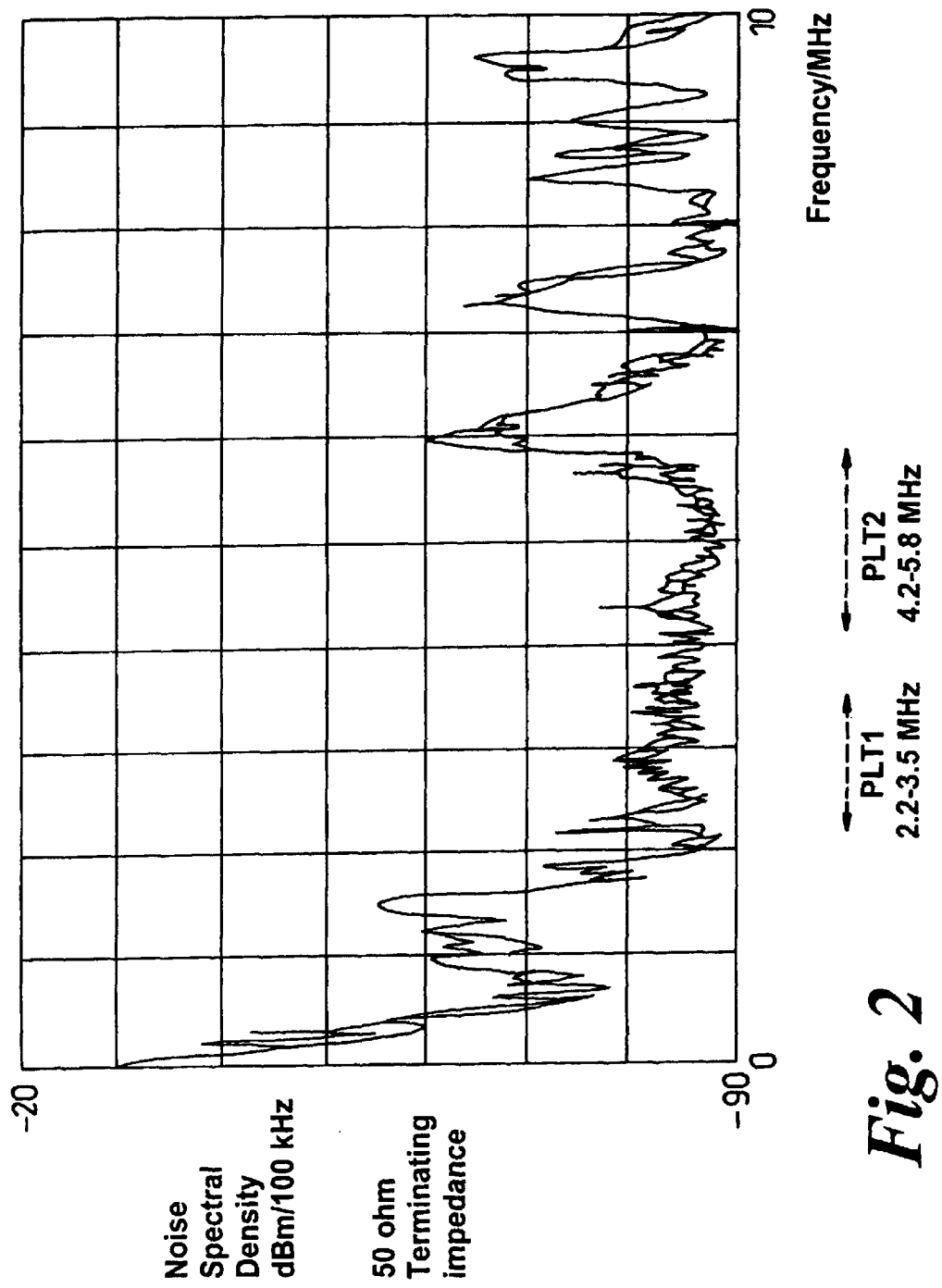
FIG. 2 is a plot of amplitude vs. frequency showing typical interference in a PL transmission medium.

A typical data transmission sequence is illustrated in FIG. 1 and comprises a train of symbols 20 of length, for example, 250 microseconds, separated by gaps 22 of a few microseconds, for example 10 microseconds. In the following description the symbol length and symbol frequency used for data transmission in any particular transmission system, are termed the normal symbol length and symbol frequency.

When the train of data-carrying symbols is received at the receiver, to retrieve the data a Fast Fourier Transform (FFT) must be performed on each symbol in order to convert that symbol from the time domain to the frequency domain, in order to recover the QPSK coded data from each carrier to reconstitute the data packet for further processing, in known manner. As discussed above, it is necessary to synchronise the FFT procedure with the received symbols to ensure accurate decoding.

Figure 5:
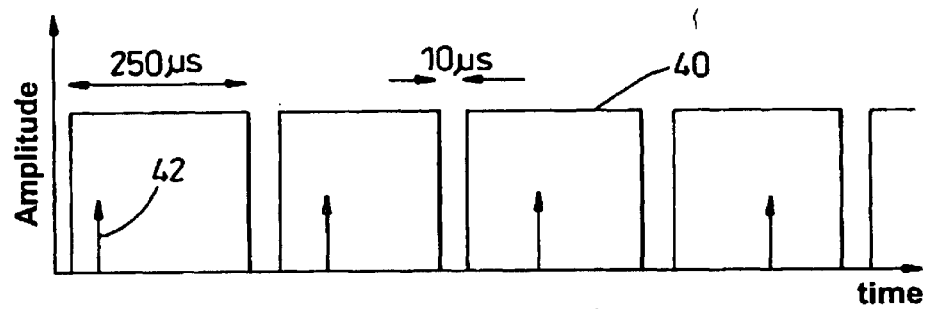
FIG. 5 is a plot of amplitude vs. time illustrating the performance of unsynchronised FFTs on a received sequence of normal-length synchronisation symbols.

In the embodiment, during a synchronisation operation started by a handshake protocol between transmitter and receiver, or on power up, the transmitter transmits a synchronisation sequence of specially-constructed symbols, having a predetermined code modulated onto the carriers. Each synchronisation symbol in the sequence is identical. In this first embodiment the synchronisation sequence comprises synchronisation symbols of normal symbol length and symbol frequency. The receiver performs a sequence of FFTs on the received symbol sequence at intervals spaced by a time interval not equal to the normal symbol period. This is illustrated in FIG. 5, which shows a sequence of synchronisation symbols 40 and the start times 42 of a succession of FFTs.

The duration, or sampling time, of each FFT is shorter than the duration of a symbol, in order to avoid edge effects during normal, synchronised, decoding. However, while unsynchronised FFTs are being performed, most may not coincide with a received symbol, but will overlap symbol edges. During synchronisation, an amplitude parameter, or output sum, is evaluated for each FFT by removing the predetermined coding from the detected, coded carriers to extract the pilot tones, or uncoded carriers, and coherently summing the phases of the pilots, as detected. The amplitude parameter, or output sum, in this case is the amplitude of the sum of the phase vectors of the detected pilots. If an FFT samples a symbol edge, portions of two successive symbols, or a period when no symbol is present, the phases of the pilots, as detected, will be random, and should therefore sum to approximately zero. If an FFT substantially coincides with a symbol or is contained within a symbol, the detected phases of the pilots should sum to a finite value, above the predetermined threshold.

Figure 6:
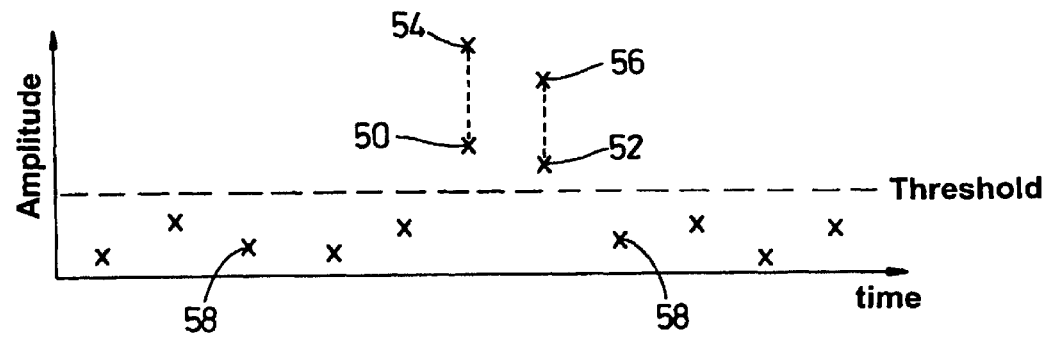
FIG. 6 illustrates the comparison of FFT outputs with a threshold to identify FFT/symbol synchronisation.

Thus, the amplitude parameters derived from each of a sequence of FFTs can be compared with an amplitude threshold to identify coincidence between particular FFTs and symbols. FIG. 6 illustrates the results of such a comparison, indicating two successive FFTs which have coincided approximately with two successive symbols. The coherent summation of the pilot phase vectors detected in the FFT outputs provides amplitude parameters 54, 56 for each of two successive FFTs which exceed the threshold. FFTs not coinciding with symbols produce much lower amplitude parameters 58 below the threshold.

During the sequence of unsynchronised FFTs, when the amplitude parameter exceeds the threshold, the presence of a symbol coinciding with the FFT is declared. This information allows subsequent coarse synchronisation of FFTs with symbols during data symbol transmission.

In the foregoing description it was noted that the time interval between successive unsynchronised FFTs should not be equal to the symbol period. This is to avoid the possibility that if the time interval is equal to the symbol period, the unsynchronised FFTs, if initially out of phase with the received symbols, may remain out of phase such that synchronisation may not be achieved. Advantageously, therefore, the unsynchronised FFTs may be performed at time intervals somewhat greater than or less than the symbol period.

In a second embodiment of the invention, after each unsynchronised FFT has been performed, the amplitude parameter or output sum may be calculated by incoherent, scalar addition of the FFT outputs. In this embodiment it is not necessary to remove data from the FFT outputs before the addition is performed. Advantageously, therefore, this procedure does not require special synchronisation symbols and can be carried out at any time on normal data-carrying symbols. No special arrangements are therefore required at the transmitter to transmit synchronisation symbols.

Despite these advantages, this embodiment has the disadvantage that the difference between the amplitude parameter, or output sum, for FFTs synchronised with symbols and not synchronised with symbols is typically less than with the coherent summation procedure of the first embodiment. This is illustrated in FIG. 6 where the incoherently-calculated amplitude parameters 50, 52 for two FFTs synchronised with successive symbols are greater than the threshold but are of lower amplitude than the coherently-calculated amplitude parameters 54, 56. In this instance, therefore, either the first or second embodiment would declare a synchronisation, but in general the noise rejection achieved by the second embodiment is lower than that achieved by the first embodiment. In a noisy environment, coherent summation of the FFT outputs is preferred.

In a further, preferred embodiment, symbols of greater length, or duration, than normal symbols are used in the synchronisation sequence of symbols. This increases the chance that an unsynchronised FFT (of normal sampling time) will be based on data taken entirely from within a symbol, and not be corrupted by edge effects. For the full benefit of this to be achieved, the symbol needs to be at least twice the length of a normal symbol, in which case an unsynchronised FFT should be contained within each extended-length symbol if the FFTs are performed at approximately the normal symbol frequency. This is illustrated in FIG. 7 which shows an FFT 60 of normal length within a synchronisation symbol 62 of extended length.

In a further preferred embodiment, the following technique may be used in combination with normal length synchronisation symbols or, advantageously, extended length synchronisation symbols. Once an FFT has been performed which has generated an amplitude parameter above the threshold, the phase gradient across the pilot tones or carriers (after removal of the predetermined coding) can be calculated. All of the pilot tones in a symbol are in phase at the start of the symbol. The relative phase between pilots of different frequencies then varies continuously during the symbol in accordance with the pilot frequencies. Therefore, if the start of an FFT is precisely synchronised with the start of a symbol, the phase gradient between the detected pilot tones will be zero. However, if the FFT starts at a time delay after the start of a symbol, the detected pilot tones will not be in phase. Since the frequency spacing between adjacent pilot tones is constant across the symbol (unless the symbol spans more than one-contiguous frequency band), the time delay corresponds to a constant phase difference between adjacent pilot tones across the symbol. In addition, the phase gradient across the pilot tones is proportional to the time delay, or timing error, between the start of the symbol and the start of the FFT. Once a valid symbol has been declared as a result of the amplitude parameter derived from an FFT exceeding the threshold, the phase gradient can therefore be used to evaluate the timing error. Thus, improved coarse synchronisation of the FFT timing can be achieved.

Evaluation of the phase slope can advantageously be combined with the use of extended length synchronisation symbols because the use of extended length symbols decreases the expected number of symbols required, and therefore the expected time, before a valid symbol can be declared, and then allows the timing error between the start of the extended length symbol and the start of the FFT to be corrected. When using extended length symbols, the timing error is likely to be greater than when normal length symbols are used, and so the timing error correction is advantageous.

Figure 7:
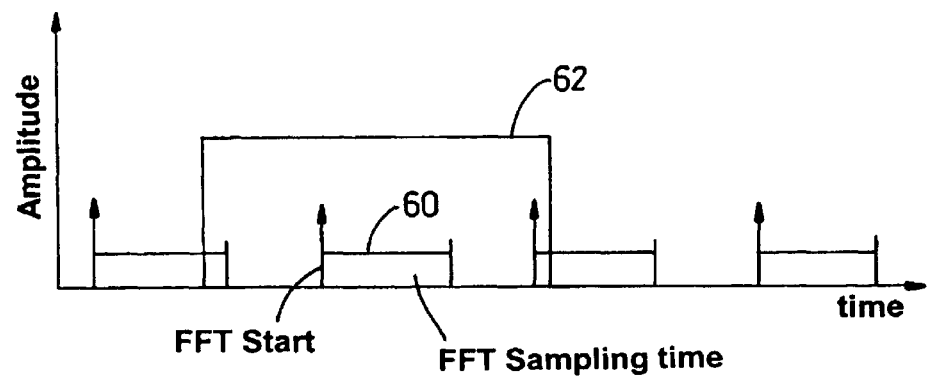
FIG. 7 is a plot of amplitude vs. time illustrating the coincidence of unsynchronised FFTs at approximately normal symbol frequency with an extended length synchronisation symbol.

In a particularly preferred embodiment, a symbol of twice the standard length is used, in which case it should be possible to declare a valid symbol within the length of a single symbol as illustrated in FIG. 7. In a more robust system, however, a sequence of two or more such double length symbols should be transmitted during the synchronisation procedure.

A complication in the evaluation of phase slope may arise if multipath signal transmission occurs. Depending on the channel transmission characteristics, multipath may lead to a non-linear phase slope across the pilots in a symbol. A best-fit slope should then be used to evaluate timing error.

By comparison with the prior art, the synchronisation methods of the embodiments advantageously use the FFT as a filter to reject out of band carriers in both the synchronisation phase and the data phase. The synchronisation process of the embodiments is therefore advantageously as robust as the data decoding process. This is particularly advantageous in transmission media which are subject to interference, such as powerline.

A potential problem with the synchronisation method of the embodiments is that the channel might corrupt the phase gradient across the pilots in a symbol in an unknown way. However, this should cause no difficulty as long as the change in channel response is sufficient slow with frequency. In addition, a linear phase gradient caused by channel effects would simply correspond to a time delay, and would automatically be corrected in the preferred embodiment in which phase slope is evaluated and symbol/FFT timing error corrected.

The only limitation to the tolerance of the embodiments described above to out of band carriers, or interference, is due to saturation of the analogue to digital converters used to convert the received signal at the receiver before the FFTs are performed.

Channel Estimate

Once FFT synchronisation has been achieved, a channel estimate can be obtained from a look-up table. Subsequent transmitted data can then be decoded after subtracting channel errors from the FFT output. The look up table is generated by comparing the predefined phase of each carrier with the actual received phase. This can be achieved on a subset of carriers by the use of interpolation. The channel estimate should be updated regularly whenever synchronisation is performed; however, in a system where the receivers are static (rather than mobile), changes in the propagation characteristics will be rarely occurring.

Clock Frequency Correction

Errors in clock frequency lead to an increment or decrement of phase between FFTs and symbols, from symbol to symbol in a sequence of received symbols. The change in phase between the FFTs and symbols can be measured using the same analysis of the phase slope between pilots as described above. Change in phase slope between successive symbols in a sequence of symbols indicates and quantifies any clock frequency error, which can then be corrected by adjusting the clock frequency. Synchronisation symbols carrying known data may be transmitted at predetermined intervals to allow continuous updating of the clock frequency (fine synchronisation).

Receiver Equipment

Figure 8:
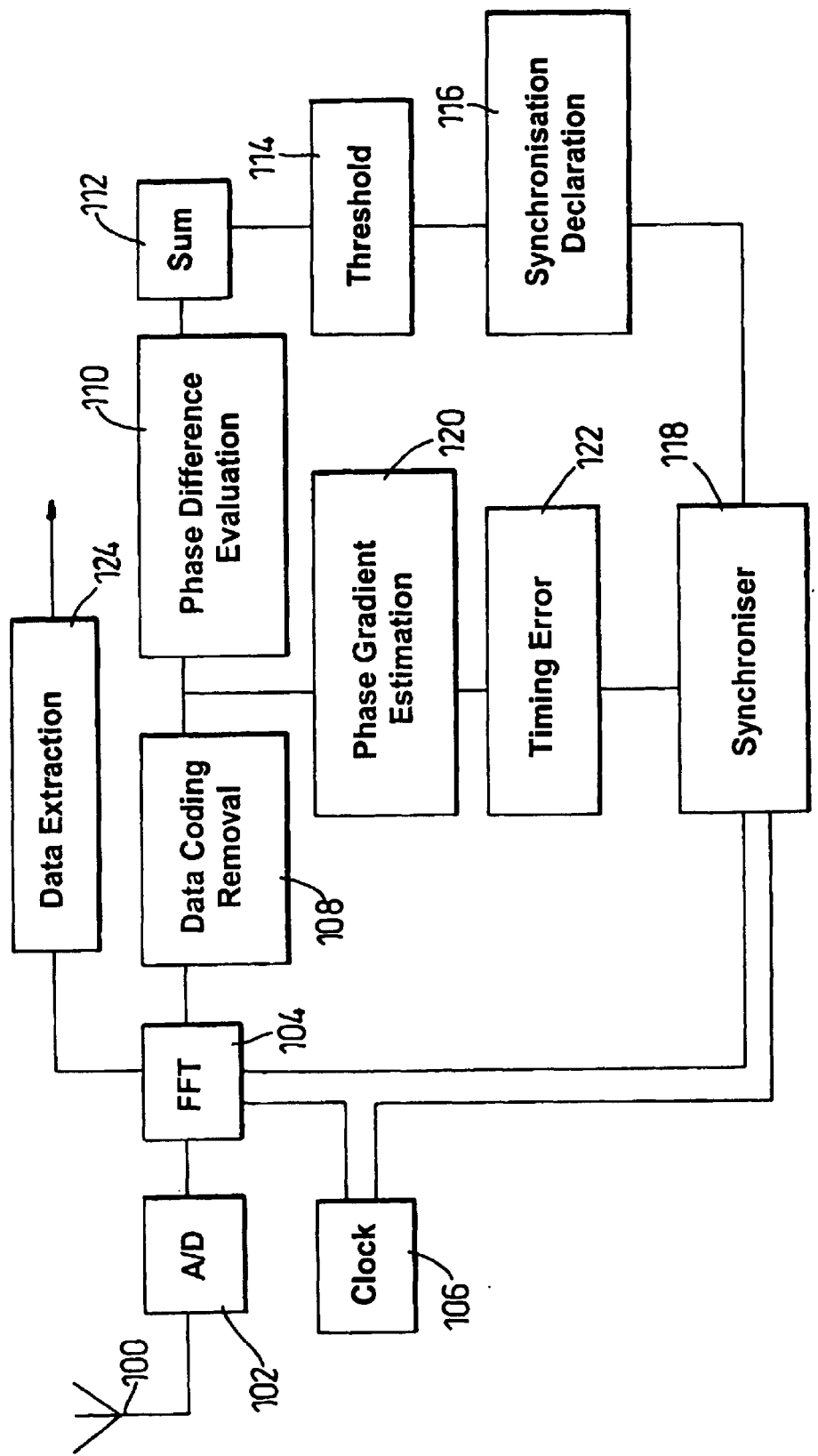
FIG. 8 is a block diagram of a receiver according to an embodiment of the invention.

FIG. 8 is a block diagram of a portion of a receiver for implementing a preferred embodiment of the invention.

An antenna 100 receives the transmitted data stream, which during a synchronisation period comprises a sequence of synchronisation symbols. An analog to digital converter (A/D) 102 digitises the received signal and passes it to a FFT processor 104. Signals from a clock 106 and a synchronisation controller 118 control the performance of an unsynchronised sequence of FFTs on the received digitised data stream. During the synchronisation method, as described above, FFTs are performed at intervals corresponding approximately to the normal symbol transmission frequency but unsynchronised with the received symbols.

During the synchronisation period, the FFT processor output is passed to a processor 108 which removes the predetermined synchronisation data coding and extracts the uncoded carriers, or pilot tones. A further processor 110 then evaluates the phases of the detected tones. The phases are added coherently by an adder 112 and compared with a threshold by a comparator 114. If the comparator detects a sum of phases which exceeds the threshold, a synchronisation declaration 116 is made, triggering a synchroniser 118. The synchroniser can then control the FFT processor in response to the clock 106 to trigger FFTs in synchronisation with subsequent symbols.

In an alternative embodiment as described above, the data coding removal processor 108 may be omitted and the FFT outputs added non-coherently by the adder 112 before the threshold comparison.

To improve the synchronisation, the carriers extracted after the synchronisation data coding has been removed are processed by a phase gradient estimator 120 which estimates the phase gradient across the carriers in the symbol at the time when they were sampled by the FFT processor. If an FFT is not synchronised with a symbol, then the phase gradient estimation is meaningless and is disregarded. This is detectable because, for the same FFT, the output of the comparator 114 will not have led to the declaration of synchronisation between the FFT and a symbol.

If a synchronisation declaration is made, then the phase gradient can be used, as described above, to derive a timing error 122 between the start of the symbol and the start of the FFT. This timing error is input to the synchroniser 118 to enable improved synchronisation. When synchronisation has been achieved, and the synchronisation period ends, data transmitted within the symbols is extracted by a data extraction processor 124 coupled to the output of the FFT processor.

What is claimed is:

1. A coarse synchronisation method for a receiver in a frequency division multiplexed (FDM) transmission system, in which a signal transmitted during a synchronisation period comprises predetermined data encoded onto a plurality of carriers of different predetermined frequencies and predetermined relative phase within each of a sequence of synchronisation symbols of predetermined symbol length transmitted at a predetermined symbol frequency, comprising the steps of:

receiving said transmitted signal at said receiver;

performing a sequence of unsynchronised Fast Fourier Transforms (FFTs) on said signal at intervals spaced by a time interval not equal to a predetermined symbol period;

removing said coding corresponding to said predetermined data from said carriers and detecting phases of said carriers;

summing said detected phases of said carriers to generate an FFT output sum for each FFT and comparing said output sum with a predetermined threshold;

declaring synchronisation of an FFT with a symbol if said output sum exceeds said threshold; and synchronising subsequent FFTs to subsequent symbols after said declaration.

2. A synchronisation method according to claim 1, in which said phases are summed coherently to generate said output sum.

3. A synchronisation method according to claim 1, further comprising the steps of; after synchronisation between an FFT and a symbol has been declared, evaluating a phase gradient of said detected phases of said carriers across said symbol;

deriving from said phase gradient and said predetermined frequencies of said carriers a timing error between a start of sad symbol and a start of said FFT; and correcting said synchronisation between subsequent FFTs and subsequent symbols by removing said timing error.

4. A synchronisation method according to claim 3, in which said phase gradient is evaluated using a best fit method.

5. A synchronisation method according to claim 1, in which said predetermined length of said synchronisation symbol is greater than a length of a normal symbol used in the data transmission system during data transmission.

6. A synchronisation method according to claim 5, in which said length of said synchronisation symbol is twice said length of said normal symbol.

7. A synchronisation method according to claim 5, in which said normal symbols are transmitted at a normal symbol transmission frequency and said unsynchronised FFTs are performed at a frequency not less than said normal symbol transmission frequency.

8. A synchronisation method according to claim 1, in which said transmission system is an orthogonal frequency division multiplexed (OFDM) transmission system.

9. A data transmission system incorporating a receiver for operating the synchronisation method of claim 1.

10. A receiver for operating the synchronisation method of claim 1.

11. A transmitter for use in the data transmission system of claim 9.

12. A coarse synchronisation apparatus for a receiver in a frequency division multiplexed (FDM) transmission system, in which a signal transmitted during a synchronisation period comprises predetermined data encoded onto a plurality of carriers of different predetermined frequencies and predetermined relative phase within each of a sequence of synchronisation symbols of predetermined symbol length transmitted at a predetermined symbol frequency, comprising;

a receiving element for receiving said signal;

a FFT processor coupled to said receiving element for performing a sequence of unsynchronised FFTs on said signal at intervals spaced by a time interval not equal to a predetermined symbol period;

a coding removal processor coupled to an output of said FFT processor for removing coding corresponding to said predetermined data from said carriers;

a phase detector coupled to said coding removal processor for detecting phases of said carriers;

a threshold processor coupled to said phase detector for summing said detected phases of said carriers to generate an output sum for each FFT and comparing said output sum with a predetermined threshold, synchronisation of an FFT with a symbol being declared if said output sum exceeds said threshold; and a synchroniser coupled to said threshold processor and said FFT processor to synchronise subsequent FFTs to subsequent symbols after said declaration.

13. A synchronisation apparatus according to claim 12, in which said threshold processor sums said phases coherently to generate said output sum.

14. A synchronisation apparatus according to claim 12, further comprising:

a phase gradient processor coupled to said phase detector for evaluating a phase gradient of said detected phases of said carriers across said symbol; and a timing error estimator coupled to said phase gradient processor for estimating from said phase gradient and said predetermined frequencies of said carriers a timing error between a start of said symbol and a start of said FFT;

in which said synchroniser corrects said synchronisation between said subsequent FFTs and subsequent symbols by removing said timing error.

15. A synchronisation apparatus according to claim 14, in which said phase gradient processor evaluates said phase gradient using a best fit method.

16. A synchronisation apparatus according to claim 12, in which said length of said synchronisation symbol is greater than a length of a normal symbol used in said data transmission system during data transmission.

17. A synchronisation apparatus according to claim 16, in which said length of said synchronisation symbol is twice said length of said normal symbol.

18. A synchronisation apparatus according to claim 16, in which said normal symbols are transmitted at a normal symbol transmission frequency and said unsynchronised FFTs are performed at a frequency not less than said normal transmission frequency.

19. A synchronisation apparatus according to claim 12, in which said transmission system is an orthogonal frequency division multiplexed (OFDM) transmission system.

20. A coarse synchronisation method for a receiver in a frequency division multiplexed (FDM) transmission system, in which a transmitted signal comprises data encoded onto a plurality of carriers of different predetermined frequencies and predetermined relative phase within each of a sequence of synchronisation symbols of predetermined symbol length transmitted at a predetermined symbol frequency, comprising the steps of:

receiving said transmitted signal at said receiver;

performing a sequence of unsynchronised Fast Fourier Transforms (FFTs) on said signal at intervals spaced by a time interval not equal to a predetermined symbol period;

summing phases of said carriers to generate an FFT output sum for each FFT and comparing said output sum with a predetermined threshold;

declaring synchronisation of an FFT with a symbol if said output sum exceeds said threshold; and synchronising subsequent FFTs to subsequent symbols after said declaration.

21. A coarse synchronisation apparatus for a receiver in a frequency division multiplexed (FDM) transmission system, in which a transmitted signal comprises data encoded onto a plurality of carriers of different predetermined frequencies and predetermined relative phase within each of a sequence of synchronisation symbols of predetermined symbol length transmitted at a predetermined symbol frequency, comprising;

a receiving element for receiving said signal;

a FFT processor coupled to said receiving element for performing a sequence of unsynchronised FFTs on said signal at intervals spaced by a time interval not equal to a predetermined symbol period;

a coding removal processor coupled to an output of said FFT processor for removing coding corresponding to said predetermined data from said carriers;

a phase detector coupled to said coding removal processor for detecting phases of said carriers;

a threshold processor coupled to said phase detector for summing phases of said carriers to generate an output sum for each FFT and comparing said output sum with a predetermined threshold, synchronisation of an FFT with a symbol being declared if said output sum exceeds said threshold; and a synchroniser coupled to said threshold processor and said FFT processor to synchronise subsequent FFTs to subsequent symbols after said declaration.

\* \* \* \* \*